(12) United States Patent
Mori et al.

(10) Patent No.: US 7,226,124 B2
(45) Date of Patent: Jun. 5, 2007

(54) HEADREST HEIGHT ADJUSTMENT DEVICE

(75) Inventors: Masatoshi Mori, Anjo (JP); Takemi Hattori, Anjo (JP)

(73) Assignee: Aisin Seiko Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 11/101,499

(22) Filed: Apr. 8, 2005

(65) Prior Publication Data

US 2005/0231018 A1   Oct. 20, 2005

(30) Foreign Application Priority Data

Apr. 16, 2004   (JP) .............................. 2004-122173

(51) Int. Cl.
  A47C 1/02   (2006.01)
  A47C 1/00   (2006.01)
  A47C 1/10   (2006.01)
(52) U.S. Cl. ................. 297/61; 297/410; 297/344.1; 297/391
(58) Field of Classification Search ............ 297/61, 297/410, 344.1, 391; 74/535, 502.2, 489
  See application file for complete search history.

(56) References Cited

U.S. PATENT DOCUMENTS

| | | | | |
|---|---|---|---|---|
| 3,065,029 A | * | 11/1962 | Spound et al. ............... | 297/391 |
| 3,471,198 A | * | 10/1969 | Downs et al. ............... | 297/410 |
| 3,499,346 A | * | 3/1970 | Ishida et al. ............... | 74/502.2 |
| 5,110,185 A | * | 5/1992 | Schmutz et al. ............ | 297/410 |
| 5,292,178 A | * | 3/1994 | Loose et al. ............. | 297/344.1 |
| 5,303,610 A | * | 4/1994 | Noel et al. ..................... | 74/535 |
| 5,918,940 A | * | 7/1999 | Wakamatsu et al. ........ | 297/410 |
| 6,345,549 B1 | * | 2/2002 | Lance ......................... | 74/500.5 |
| 6,390,558 B2 | * | 5/2002 | Fischer et al. .............. | 297/410 |
| 2001/0002764 A1 | | 6/2001 | Fischer et al. | |
| 2001/0013718 A1 | * | 8/2001 | Beck ........................... | 297/410 |
| 2002/0113467 A1 | | 8/2002 | Radmanic | |

(Continued)

FOREIGN PATENT DOCUMENTS

DE   29 25 781 A1   1/1981
DE   196 31 843 A1   2/1998

(Continued)

OTHER PUBLICATIONS

European Search Report dated Apr. 28, 2006.

*Primary Examiner*—David R. Dunn
*Assistant Examiner*—Sarah B. McPartlin
(74) *Attorney, Agent, or Firm*—Buchanan Ingersoll & Rooney PC

(57) ABSTRACT

A headrest height adjustment device includes a base member fixed on a seatback of a seat body, a pulley rotatably supported by the base member, the pulley being rotatable in a first direction by unwinding a first end of a rope member wound around the pulley and winding a second end of the rope member in conjunction with sliding movement of the seat body, and the pulley being rotatable in a second direction by winding the first end of a rope member and unwinding the second end of the rope member in conjunction with sliding movement, a rotational arm rotatably supported by the base member and rotated by the pulley by a rotation transmission member, and a conversion member engaged with the rotational arm for operating a headrest in an upward or downward direction by converting rotational movement of the rotational arm into linear movement.

20 Claims, 5 Drawing Sheets

U.S. PATENT DOCUMENTS

2005/0073180 A1* 4/2005 Reed et al. .................. 297/61
2005/0116523 A1* 6/2005 Terada et al. ............... 297/391
2006/0103216 A1* 5/2006 Hoekstra et al. ........... 297/410

FOREIGN PATENT DOCUMENTS

DE 198 11 688 C1 9/1999
JP 2003093191 A * 4/2003

* cited by examiner

HEADREST HEIGHT ADJUSTMENT DEVICE

CROSS REFERENCE TO RELATED APPLICATIONS

This application is based on and claims priority under 35 U.S.C. §119 with respect to Japanese Patent Application No. 2004-122173 filed on Apr. 16, 2004, the entire content of which is incorporated herein by reference.

FIELD OF THE INVENTION

The present invention relates to a headrest height adjustment device. More particularly, the present invention pertains to a headrest height adjustment device for adjusting the height of a headrest that performs in conjunction with the sliding movement of a seat body.

BACKGROUND

Known headrest height adjustment devices are described in DE 196 31 843 A1 (FIGS. 2–3) and DE198 11 688 C1 (FIG. 3). The known headrest height adjustment devices adjust a height of a headrest that performs in conjunction with the sliding movement of a seat body in a longitudinal direction of a vehicle. According to the known headrest height adjustment devices, a user (e.g., a driver) can manually adjust a height of a headrest individually.

Because the known headrest height adjustment devices described in DE 196 31 843 A1 and DE198 11 688 C1 include a mechanism for adjusting a height of a headrest that performs in conjunction with the sliding movement of the seat body as well as a mechanism for manually adjusting a height of a headrest individually, construction of a headrest height adjustment device has become complicated.

Further, with the construction of headrest height adjustment devices described in DE 196 31 843 A1 and DE198 11 688 C1, the tension of a cable is used for operating the headrest in either an upward or downward direction, and the biasing force of a spring is used for operating in the opposite, downward or upward, direction. Thus, the space required for positioning the mechanism used for operating the headrest in an upward direction and downward becomes substantial. In other words, the total amount of space is increased by the amount of space required for positioning the spring used for operating the headrest in either an upward or downward direction. In particular, with the construction described in, DE 196 31 843 A1 because the mechanism for adjusting a height of the headrest individually is itself operated in upward and downward directions, a requirement arises for space in which the locus for the upward and downward directions operation can be released. On the other hand, with the construction described in DE198 11 688 C1, sufficient space is required for covering a joint portion of a double pipe which is configured so as to expand and contract.

Thus, it is extremely difficult to install the known headrest height adjustment devices described in DE 196 31 843 A1 and DE198 11 688 C1 inside a seatback of a general design. More particularly, as shown in FIG. 7, a seatback 91 for a vehicle seat of a general design is configured so as incline towards the back of a vehicle in a longitudinal direction. On the other hand, the operational direction of a headrest 92 is determined to be an approximately vertical direction of the vehicle in order to maintain a predetermined constant distance between the headrest 92 and a human body that is occupying the seat. Further, in order to secure space for the feet F of an occupant of a rear seat, the seatback 91 includes a back 91a that is hollowed out in the most forward direction possible. With the foregoing configurations, when the headrest 92 is operated to the maximum downward position possible, it becomes impossible to secure a sufficient distance between an end 93a of a stay 93 and the back 91a (i.e., design surface). This restriction limits the space that is required for the mechanisms in the operational direction of the headrest 92 in upward and downward directions, that is in an extending direction of the stay 93.

Further, with the known headrest height adjustment devices described in DE 196 31 843 A1 and DE 198 11 688 C1, in order to use a mechanism for adjusting the height of a headrest that performs in conjunction with the sliding movement simultaneously with a mechanism for adjusting the height of the headrest individually, a lock release mechanism for releasing the headrest is connected to an operational system (e.g., slide lever) of a seat slide mechanism. This arrangement is for purposes of stabilizing the adjustment operation of a height of the headrest in conjunction with the sliding movement and involves resetting the height of the headrest to an initial state that has been individually adjusted at the time of a sliding operation. Accordingly, in cases where a headrest height adjustment device is applied to a motor driven (electrically driven type) seat slide mechanism, a dedicated actuator is required for releasing the headrest in synchronization with the timing of activating a motor.

Further, in order to prevent noise caused by oscillation while a vehicle is moving, a clearance between the stay 93 of the headrest and a sliding guide support 94 (shown in FIG. 7) is generally set at a minimum level, and thus sliding resistance between the stay 93 and the sliding guide support 94 becomes substantial. Accordingly, with the construction of the known headrest height adjustment devices described in DE 196 31 843 A1 and DE198 11 688 C1 where a biasing force of the spring is used for achieving either an upward or downward operation of the headrest, there is a danger that, a desired operation may not be achievable because of inadequate biasing force resulting from dispersion of sliding resistance in circumstances where the headrest height adjustment device is manufactured on the basis of large scale production.

A need thus exists for a headrest height adjustment device in which increases in space required for installment can be kept under control and the headrest operated stably in an upward and downward direction, in conjunction with a sliding movement of a seat body.

SUMMARY OF THE INVENTION

In light of the foregoing, the present invention provides a headrest height adjustment device, which includes a base member fixed on a seatback of a seat body, a pulley rotatably supported by the base member, the pulley being rotatable in a first direction by unwinding a first end of a rope member wound around the pulley and by winding a second end of the rope member in conjunction with sliding movement of the seat body either in a forward or rearward direction, and the pulley being rotatable in a second direction by winding the first end of a rope member wound around the pulley and unwinding the second end of the rope member in conjunction with sliding movement of the seat body, a rotational arm rotatably supported by the base member and rotated by the pulley by a rotation transmission member, and a conversion member engaged with the rotational arm for operating a headrest in an upward or downward direction by converting rotational movement of the rotational arm into linear movement.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

One embodiment of the present invention will be explained with reference to illustrations of drawing figures as follows.

Figure 5:
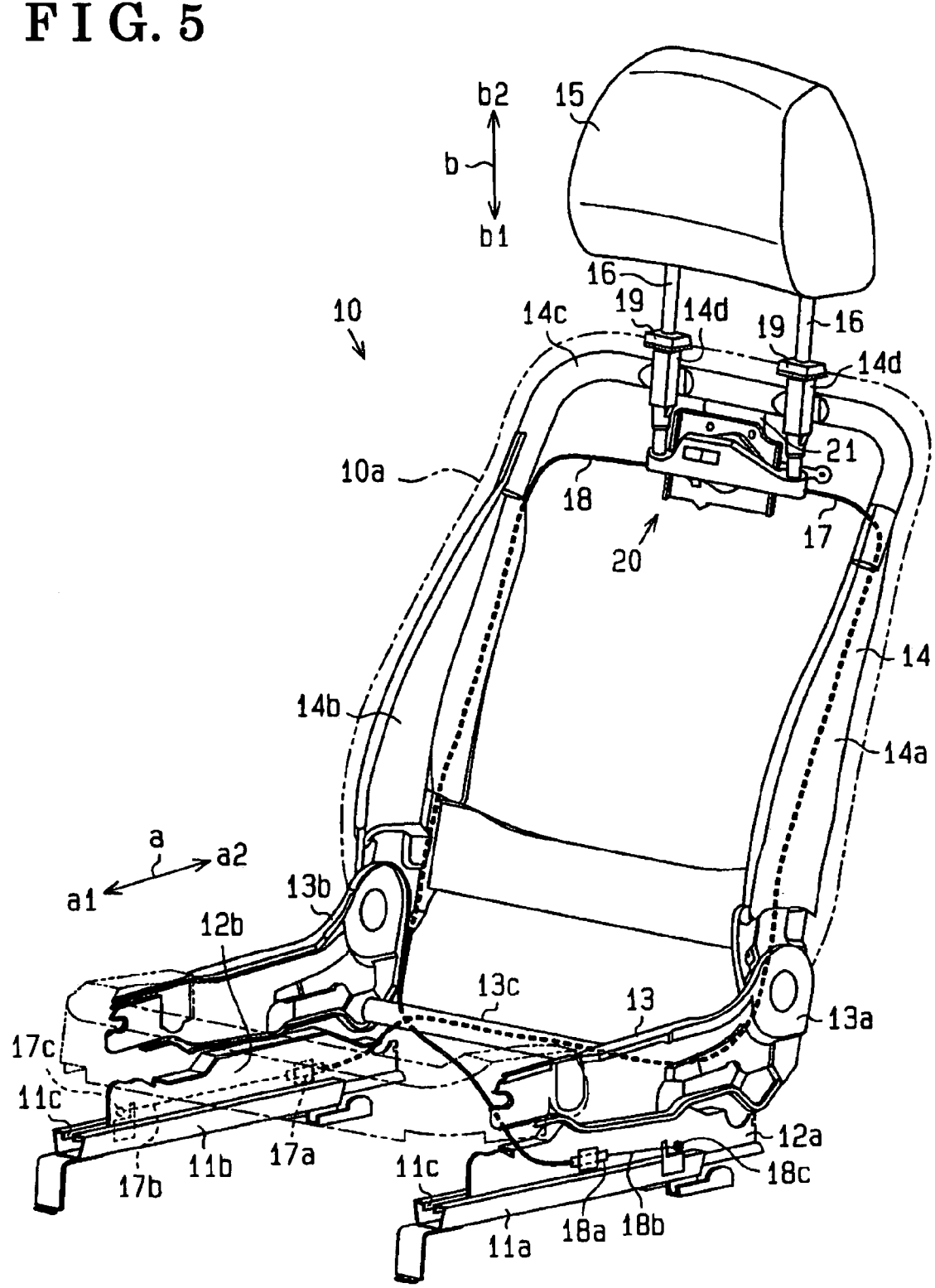
FIG. 5 is a perspective view showing a frame portion of a vehicle seat.

As shown in FIG. 5, a vehicle seat 10 includes a pair of lower rails 11a, 11b respectively provided on the left and right sides, as seen when one faces the front of the vehicle, a pair of upper rails 12a, 12b respectively provided on the left and right sides, as seen when one faces the front of the vehicle, a seat cushion frame 13, a seatback frame 14, a headrest 15, and a headrest operating mechanism 20.

The lower rails 11a, 11b are fixed on a vehicle floor via brackets in an arrangement where a longitudinal direction of the lower rails 11a, 11b corresponds to a longitudinal direction of the vehicle (i.e., in the direction of arrow a in FIG. 5). The lower rails 11a, 11b are configured so as to have a U shape in cross section so that the upper part of the lower rails 11a, 11b is open, and an open portion that is opened extends in a longitudinal direction of the lower rails 11a, 11b and forms a slide groove 11c. The upper rails 12a, 12b are slidably provided respectively on the lower rails 11a, 11b along the slide grooves 11c in a longitudinal direction.

The seat cushion frame 13 forms the frame of a seat cushion for constructing a seat surface of a seat body. The seat cushion frame 13 includes lower arms 13a, 13b that form a pair in a width direction of the vehicle, and a connection rod 13c that connects the lower arms 13a, 13b. The seat cushion frame 13 is supported by the upper rails 12a, 12b via the lower arms 13a, 13b respectively. A seatback frame 14 is connected to rear ends of the lower arms 13a, 13b so as to be rotatable about the seat cushion frame 13. The seatback frame 14 serves as a frame for a seatback 10a that acts as a seatback of the seat body, and includes side frames 14a, 14b that serve as a pair in a width direction of the vehicle, and an upper pipe 14c that connects top ends of the side frames 14a, 14b. Support pipes 14d that form a pair in a width direction of the vehicle are secured to an intermediate portion of the upper pipe 14c. The support pipes 14d are fixed to the intermediate portion of the upper pipe 14c in an arrangement such that an axial direction of the support pipes 14d corresponds to an operational direction (i.e., in the direction of arrow b in FIG. 5) of the headrest 15 which is substantially vertical.

The headrest 15 integrally includes a pair of stays 16 extending coaxially with each of the support pipes 14d. The headrest 15 is connected to the seatback frame 14 so to be operated by means of stays 16, 16 respectively inserted into the supports pipes 14d, 14d. Each stay 16 is provided with a slide guide support 19 positioned on a seatback 10a above the support pipe 14d. When the headrest 15 is operated, by sliding an external surface of the stay 16 along an internal surface of the sliding guide support 19, the sliding guide support 19 prevents sudden operations of the headrest 15.

The headrest operating mechanism 20 is supported by the upper pipe 14c via a bracket 21 secured to the upper pipe 14c below and between the support pipes 14d. A double piped cable 17 (i.e., serving as a rope member) for operating the headrest in an upward direction and a double piped cable 18 (i.e., serving as a rope member) for operating the headrest in a downward direction respectively extend from a first side and a second side of the headrest operating mechanism 20.

A cable end 17a of the cable 17 for operating the headrest in an upward direction is fixed on an exterior surface of the first upper rail, and an end 17c of an inner wire 17b protruding from a tip thereof is fixed on an exterior surface of the first lower rail 11b. The end 17c is positioned closer to the front of the vehicle than to the cable end 17a (i.e., the direction of arrow a1 in FIG. 5). The cable 17 for operating the headrest in an upward direction extends from the first upper rail 12a to the second lower arm 13a in a longitudinal direction of the connection rod 13c, and further extends in a longitudinal direction of the second side frame 14a so that an end of the cable 17 for operating the headrest in an upward direction is connected to the headrest operating mechanism 20.

A cable end 18a of the cable 18 for operating the headrest in a downward direction is fixed on an exterior surface of the second upper rail 12a, and an end 18c of an inner wire 18b protruding from an end thereof is fixed on an exterior surface of the second lower rail 11a. The end 18c is positioned so as to be further to the rear of the vehicle than the cable end 18a (i.e., the direction of arrow a2 in FIG. 5). The cable 18 for operating the headrest in a downward direction extends from the second upper rail 12a to the first lower arm 13b, and further extends in a longitudinal direction of the first side frame 14b so that an end of the cable 18 for operating the headrest in a downward direction is connected to the headrest operating mechanism 20.

Accordingly, when the seat body (i.e., the seat cushion frame 13) is operated so as to slide rearward (i.e., in the direction of arrow a2), the distance between the cable end 17a and the end 17c is increased, while, on the other hand, when the seat body (i.e., the seat cushion frame 13) is operated so as to slide forward (i.e., in the direction of arrow a1), the distance between the cable end 18a and the end 18c is increased. According to the embodiment of the present invention, when the seat body slides in a rearward direction (i.e., in the direction of arrow a2), the headrest operating mechanism 20 moves the headrest 15 in a upward direction (i.e., in the direction of arrow b2) by means of the tension transmitted by the cable 17 for operating the headrest in an upward direction. On the other hand, when the seat body slides forward (i.e. in the direction of arrow a1), the headrest operating mechanism 20 moves the headrest 15 downward (i.e. in the direction of arrow b1) by means of the tension transmitted by the cable 18 for operating the headrest in a downward direction.

Figure 1:
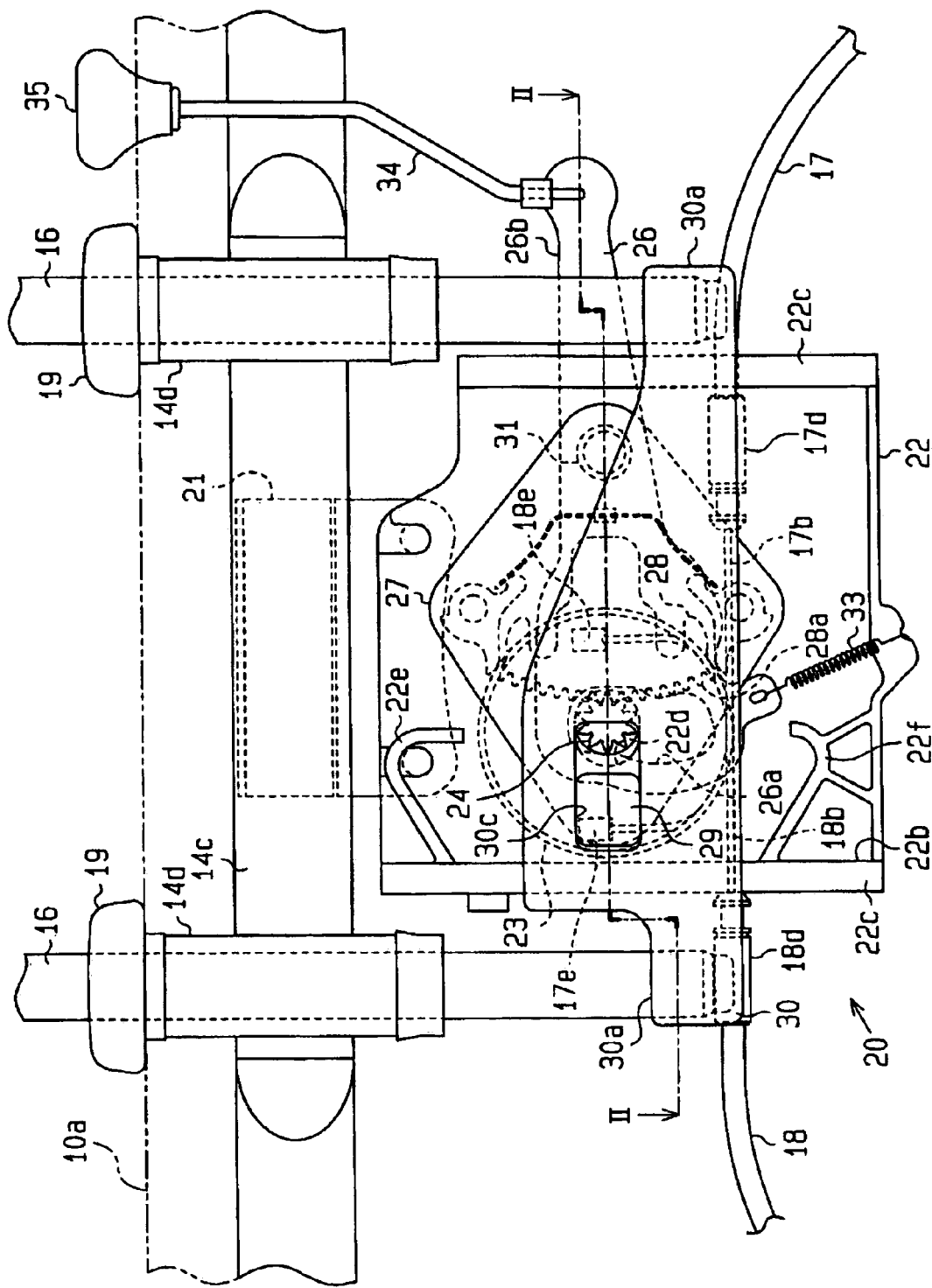
FIG. 1 is a front view according to an embodiment of the present invention.

The construction of the headrest operating mechanism 20 will next be explained with reference to FIGS. 1–4, as follows. FIG. 1 shows a state in which the headrest operating mechanism 20 is positioned at a central position within a moving range in which it performs in conjunction with a sliding movement.

Figure 2:
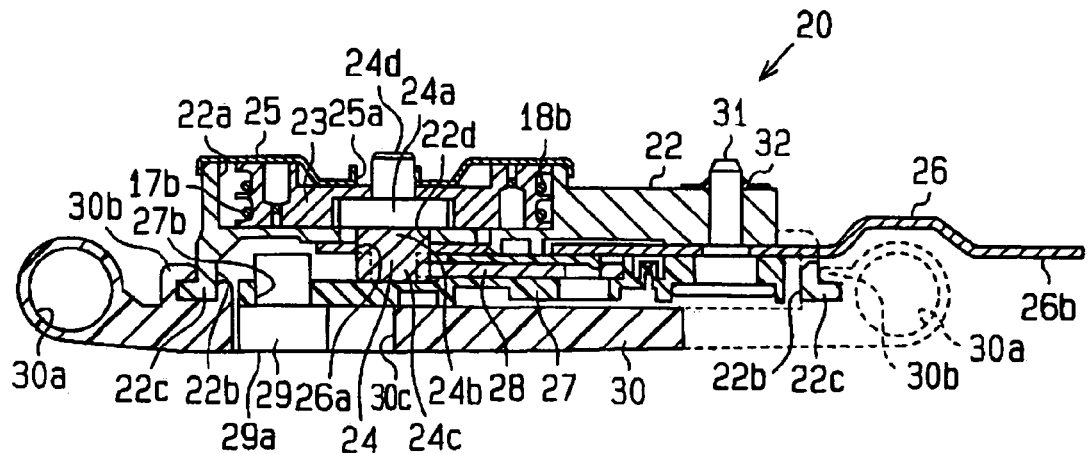
FIG. 2 is a cross-sectional view taken on line II—II in FIG. 1 according to the embodiment of the present invention.

As shown in FIGS. 1–2, the headrest operation mechanism 20 includes a base member 22 provided at the bracket 21, a pulley 23, a driving gear 24 (i.e., serving as a rotation transmission member), a cover 25, a lock release lever 26, a rotational arm 27, a fan shaped gear 28 (i.e., serving as a rotation transmission member and a driven gear), a bush 29, and a slider 30 (i.e., serving as a conversion member).

The base member 22 is configured as a plate that extends in upward and downward directions of the headrest 15 between the stays 16, 16. An accommodation recess portion 22a concaved towards the front side (i.e., the bottom side in FIG. 2) at a first side (i.e., the left side in FIG. 2) are formed on a rear surface (i.e., the top side in FIG. 2) of the base member 22. Projection walls 22b protruding towards the front side (i.e., the bottom side in FIG. 2) is formed on both sides (i.e., on both the left and right sides in FIG. 2) of the base member 22. A guide portion 22c bent outwardly is formed on each of the mutually opposing ends of the projection wall 22b. A long bore 22d configured so as to be long in a left and right direction in FIG. 2 is formed at a central portion of the accommodation recess portion 22a.

A stopper 22e at an upward direction side is formed integrally with the projection wall 22b on the left side in FIG. 1, at a first side (i.e., the top side in FIG. 1) of the base member 22. The stopper 22e at the upward direction side is configured into a hook shape that extends diagonally upward towards the center of the base member 22, and a tip of the stopper 22e is bent downward. A stopper 22f at a downward direction side is formed integrally with the projection wall 22b at a second side (i.e., at the bottom side in FIG. 1) of the base member 22. On the other hand, the stopper 22f at a downward direction side includes a hook shape configuration which extends diagonally downward towards the center of the base member 22, and a tip of the stopper 22f is bent upward. The stopper 22e at the upward direction side and the stopper 22f at the downward direction side are formed so that the bent tip ends oppose each other in a direction approximately parallel to an longitudinal direction of the projection wall portion 22b.

The pulley 23 is accommodated in the accommodation recess portion 22a and supported by the base member 22 so as to be unitarily rotatable with the driving gear 24 relative to the base member 22, and so as to be movable in a longitudinal direction of the long bore 22d. More particularly, the driving gear 24 includes a fixed portion 24a fitted into the pulley 23 so as not to be able to rotate, a first shaft portion 24b and a gear potion 24c that protrudes from the fixed portion 24a to a first side (i.e., the bottom side in FIG. 2) and so as to be coaxial with the pulley 23, and a second shaft portion 24d that is coaxial with the pulley 23 and protrudes from the fixed portion 24a to a second side (i.e., the top side in FIG. 2). By positioning the first shaft portion 24b so as to penetrate through the long bore 22d, the driving gear 24 is unitarily supported with the pulley 23 so as to be rotatable relative to the base member 22, and supported so as to be movable in the longitudinal direction of the long bore 22d. A tip of the first shaft portion 24b is penetrated through the long bore 22d so as to be projected to the first side (i.e., the bottom side in FIG. 2). A tip of the second shaft portion 24d is penetrated through the center of the pulley 23 so as to be projected to the second side (i.e., the top side in FIG. 2).

The connections, between, on the one hand, the pulley 23 and, on the other hand, both the cable 17 for operating the headrest in an upward direction and the cable 18 for operating the headrest in a downward direction, will be explained below. The cable 17 for operating the headrest in an upward direction extends from a first side (i.e., the right side in FIG. 1) of the base member 22, and a cable end 17d is fixed to the base member 22. The cable end 17d is fixed to the base member 22 at a first side of the pulley 23 (i.e., the right side in FIG. 1), and below the center of the pulley 23. The inner wire 17b protruding from the tip of the cable end 17d is wound around the pulley 23, clockwise in FIG. 1, and an end 17e of the inner wire 17b is fixed to the pulley 23.

On the other hand, the cable 18 for operating the headrest in a downward direction extends from a second side (i.e. the left side in FIG. 1) of the base member 22, and a cable end 18d of the cable 18 is fixed to the base member 22. The cable end 18d is fixed to the base member 22 at a second end of the pulley (i.e., the left side in FIG. 1) and below the center of the pulley 23. The inner wire 18b protruding from a tip of the cable end 18d is wound around the pulley 23, counterclockwise in FIG. 1, and an end 18e of the inner wire 18b is fixed to the pulley 23.

Thus, when the seat body slides in a backward direction (i.e., in the direction of arrow a2 in FIG. 5) and a distance between the cable end 17a and the end 17c is increased, the inner wire 17b wound around the pulley 23 is pulled accordingly, and the pulley 23 rotates, counterclockwise in FIG. 1, along with the driving gear 24. At this time, in response to the unwinding of the inner wire 17b from the pulley 23, the inner wire 18b of the cable 18 for operating the headrest in a downward direction is wound around the pulley. On the other hand, when the seat body slides in a forward direction (i.e., in the direction of arrow a1 in FIG. 5), and a distance between the cable end 18a and the end 18c is increased, the inner wire 18b wound around the pulley 23 is pulled accordingly, and the pulley 23 rotates, clockwise, in FIG. 1, along with the driving gear 24. At this time, in response to the unwinding of the inner wire 18b from the pulley 23, the inner wire 17b of the cable 17 for operating the headrest in an upward direction is wound around the pulley 23.

Figure 3:
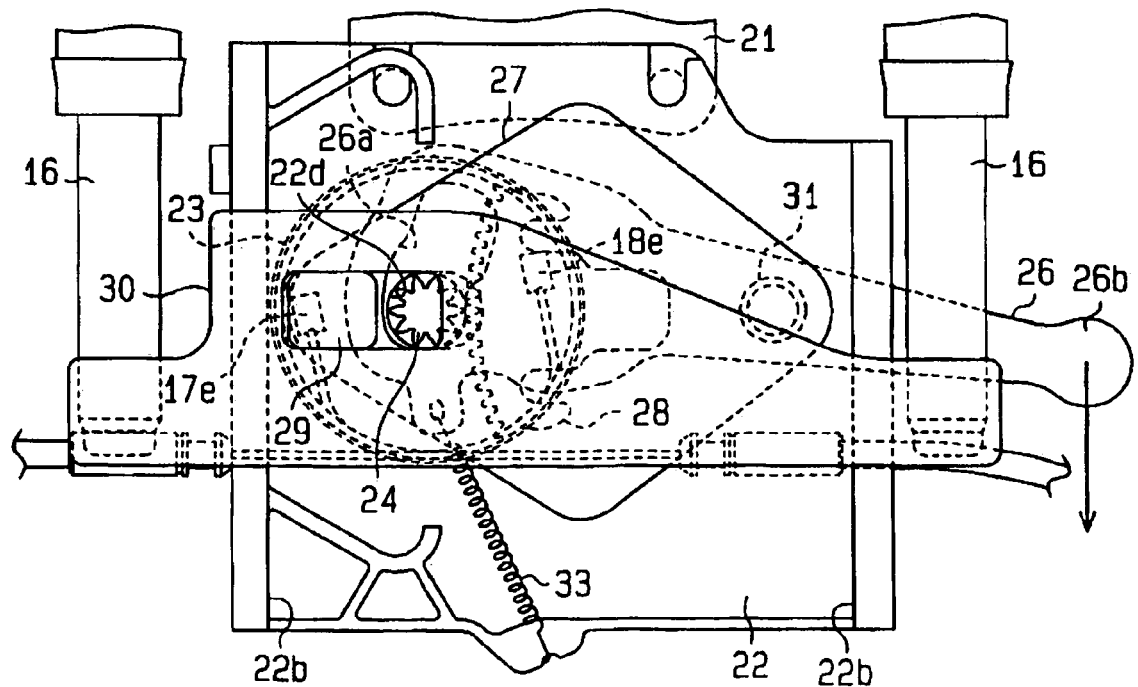
FIG. 3 is a front view showing operation according to the embodiment of the present invention.

By unwinding either the inner wire 17b or the inner wire 18b and winding the other of the inner wire 18b or the inner wire 17b by the pulley 23, the driving gear 24 moves in the longitudinal direction of the long bore 22d at the first shaft portion 24b (shown in FIG. 3). Accordingly, the pulley 23 and the driving gear 24 move in the longitudinal direction of the long bore 22d.

The cover 25 is secured to an open end of the accommodation recess portion 22a to maintain the pulley 23 accommodated in the accommodation recess portion 22a. A long bore 25a, which is long in the right-left direction in FIG. 2, is open in the center of the cover 25. The long bore 25a is positioned coaxially to the long bore 22d of the base member 22. A tip of the second shaft 24d that penetrates through the center of the pulley 23 is positioned therethrough. By positioning the second shaft 24d through the long bore 25a, the pulley 23 and the driving gear 24 are supported so as to be rotatably relative to the cover 25 (i.e. the base member 22), and so as to be movable in the longitudinal direction of the long bore 25a. The movable range of the second shaft 24d in the long bore 25a is defined to correspond to the movable range of the first shaft 24b in the long bore 22d.

In other words, according to the embodiment of the present invention, the first shaft portion 24b and the second shaft portion 24d of the driving gear 24, together with the pulley 23 serve as a rotational shaft. The long bores 22d, 25a partially serve as bearings of the first and the second shafts 24b, 24d respectively.

The lock release lever 26 is provided between the base member 22 and the rotational arm 27 at the front side (i.e., the bottom side in FIG. 2) of the base member 22. The lock release member 26 is rotatably connected relative to the base member 22 via a hinge pin 31 which penetrates through the base member 22, the lock leaver 26, and the rotational arm 27 and on the intermediate portion of the lock release member 26. The lock release lever 26 is pivotally supported by the hinge pin 31 at the opposite side (i.e., the right side in FIG. 2) of the accommodation recess portion 22a. The hinge pin 31 is prevented from being pulled out by means of a push nut 32 fitted at a tip portion of the hinge pin 31 protruding to the rear side of the base member 22.

A cam bore 26a into which a tip of the first shaft portion 24b of the driving gear 24 penetrates through the long bore 22d is formed on the lock release lever 26 at a side of the pulley 23 whereas the rotational center (i.e., the hinge pin 31) is provided at an intermediate portion of the lock release lever 26. The cam bore 26a is configured to have a long bore extending in a peripheral direction of the rotational center (i.e., the hinge pin 31), and to define the movement of the first shaft portion 24b in a longitudinal direction in the long bore 22d. Accordingly, the rotational center of the driving gear 24 and the pulley 23 is defined by surrounding the first shaft portion 24b by an inner wall surface of the long bore 22d and by an inner wall surface of the cam bore 26a. A distance in a radial direction from the rotational center of the lock release lever 26 to the inner wall surface at a first side in a peripheral direction of the cam bore 26a (i.e., a clockwise direction side in FIG. 1) is determined to be shorter than a distance in a radial direction from the rotational center of the lock release lever 26 to the inner wall surface at a second side in a peripheral direction (i.e., a counterclockwise direction side in FIG. 1) of the cam bore 26a.

A first end of a tension spring 33 (i.e., serving as a biasing means) is engaged with a bottom portion of the base member 22, and a second end of the tension spring 33 is engaged with the lock release lever 26 so that the lock release lever 26 is biased to rotate, counterclockwise in FIG. 1. Thus, with a normal lever position shown in FIG. 1, a radial distance from the rotational center to the driving gear 24 becomes shorter because the first shaft portion 24b (i.e., the driving gear 24) positioned through the cam bore 26a is guided to the inner wall surface of the cam bore 26a at the first side in the peripheral direction. In this case, the first shaft portion 24b and the second shaft portion 24d contact the inner wall surface at the hinge pin 31 side of the long bores 22d, 25a, respectively.

A connection portion 26b is formed on the lock release lever 26 at the opposite side of the cam bore 26a relative to the rotational center (i.e., the hinge pin 31) of the lock release lever 26. A first end of a rod 34 is connected to the connection portion 26b. The rod 34 is extends to the upper pipe 14c side. An operational knob 35 which appears above the seatback 10a is fixed on a second end of the rod 34. Accordingly, when the operational knob 35 is pushed down by means of an external force (i.e., external operational force), the connection portion 26b is pushed via the rod 34, and, as shown in FIG. 3, the lock release lever 62 rotates clockwise against the tension spring 33. In this case, because the first shaft portion 24b (i.e., the driving gear 24) which is positioned through the cam bore 26a is guided to the inner wall surface at the second side in the peripheral direction of the cam bore 26a, the driving gear 24 moves in the longitudinal direction of the long bores 22d, 25a so that the radial distance from the rotational center of the lock release lever 26 becomes longer. Thereafter, the first shaft portion 24b and the second shaft portion 42d contact the inner wall surface of the long bores 22d, 25a respectively at the opposite side of the hinge pin. When the external force of the operational knob 35 is released, the lock release lever 26 is returned to the normal lever position by means of the biasing force of the tension spring 33.

The rotational arm 27 rotatably connected to the base member 22 via the hinge pin 31 has an approximately diamond shape. The fan shape gear 28 is secured to the central portion of the rear side (i.e., the top in FIG. 2). The fan shape gear 28 includes a gear portion 28a extending in a peripheral direction of the rotational center (i.e., the hinge pin 31).

The gear portion 28a is arranged to be geared with the gear portion 24c when the lock release lever 26 is in the normal lever position and when the radial distance from the rotational center to the driving gear 24 has become short. Thus, when the driving gear rotates along the pulley 23, the rotational force is transmitted to the fan 28 via the gear portions 24c, 28a, and the fan shaped gear 28 rotates unitarily with the rotational arm 27. The rotational arm 27 rotates clockwise so as to move upward the tip portion of the rotational arm 27 when the pulley 23 rotates, counterclockwise in FIG. 1. On the other hand, when the pulley 23 rotates, clockwise in FIG. 1, the rotational arm 27 rotates counterclockwise so as to move downward the tip portion of the rotational arm 27.

On the other hand, the gear portion 28a is arranged so as to be released from a geared state with the gear portion 24c when the operational knob 35 is pushed downward and the radial distance from the rotational center to the driving gear 24 has become long (shown in FIG. 3). Accordingly, In these circumstances, the fan shaped gear 28 and the rotational arm 27 rotate freely without interfering with the driving gear 24.

The rotational arm 27 includes a shaft bore 27b at a tip portion thereof. A cylindrical portion of the bush 29 penetrates through the shaft bore 27b, and the rotational arm 27 supports the bush 29. The bush 29 includes a slide portion 29a having a block configuration and projected to the front side of the rotational arm 27.

A tip portion of the bush 29 penetrates the shaft bore 27b and is positioned to be engaged with curved portions of either the upward direction stopper 22e or the downward direction stopper 22f of the base member 22 when the rotational arm 27 rotates. Thus, the rotation of the rotational arm 27 is restricted by means of the engagement of the tip portion of the bush 29 with curved portions of either the upward direction stopper 22e or the downward direction stopper 22f. In other words, the rotation of the rotational arm 27 to move the tip side thereof upward is restricted by the engagement of the tip portion of the bush 29 with the curved portion of the upward direction stopper 22e. On the other hand, the rotation of the rotational arm 27 to move the tip side thereof downward is restricted by the engagement of the tip portion of the bush 29 with the curved portion of the downward direction stopper 22f.

The slider 30 is configured to bridge stays 16, 16. A holder portion 30a for fixing and holding a tip portion of each of the stays 16 is formed at both sides of slider 30 in a longitudinal direction (i.e., on both the right and left sides in FIG. 2).

Accordingly, when either of the headrest 15 and the slider 30 moves upward or downward, the other one of the headrest 15 and the slider 30 also moves in the same direction via the stays 16, 16.

A pair of guide portions 30*b*, 30*b*, into which the guide portions 22*c* of the base member 22 is positioned is formed on the rear side of the slider 30. Because of engagements between the guide portions 22*c* and the guide portions 30*b*, the slider 30 is restricted so as to move only in an upward direction of the headrest 15 relative to the base member 22.

The slider 30 includes a long bore 30*c* which is configured so as to be long, in a right-left direction in FIG. 2. The slide portion 29*a* of the bush 29 is slidably provided in the long bore 30*c* in the longitudinal direction. Thus, when the bush 29 moves upward or downward with the tip portion of the rotational arm 27 in accordance with the rotation of the rotational arm 27, the slide portion 29*a* slides into the long bore 30*c* and pushes against the inner wall surface of the long bore 30*c*, and the slider 30 is thus guided by the guide portions 22*c*, and the guide portions 30*b*. In other words, the slider 30 moves upward and downward by converting the rotational movement of the rotational arm 27 to a linear movement (i.e., an upward and downward movement). In contrast, when the slider 30 moves upward and downward, the slider 30 converts the linear movement to the rotational movement of the rotational arm 27. In these circumstances, the headrest 15 is moved via the stays 16.

The basic operation of the headrest operating mechanism 20 explained above can be summarized as follows. First, the upward and downward movement of the headrest 15 in conjunction with the sliding movement will be explained. When the seat body slides in a backward direction (i.e., in the direction of arrow a2 in FIG. 5) and a distance is increased between the cable end 17*a* and the end 17*c* of the cable 17 for operating the headrest in an upward direction, the inner wire 17*b* wound around the pulley 23 is thereby pulled, and the pulley 23 rotates, counterclockwise in FIG. 1, along with the driving gear 24. In these circumstances, the driving gear 24 is guided into the cam bore 26*a* of the lock release lever 26 at the normal lever position and is positioned closer to the rotational center (i.e., hinge pin 31), and the gear portion 24*c* is geared with the gear portion 28*a* of the fan shaped gear 28. Thus, the rotational arm 27 connected to the driving gear 24 via the fan shaped gear 28 rotates, clockwise in FIG. 1, along with the bush 29. In other words, the rotational arm 27 rotates in a direction so as to move the tip portion of the rotational ram 27 upward along with the bush 29, within a range restricted by the stopper 22*e* at the upward direction side.

Because the slide portion 29*a* of the bush 29 slides into the long bore 30*c* of the slider 30 as it pushes against the inner wall surface of the long bore 30*c*, the slider 30 is guided by the guide portions 22*c*, 30*b* so as to be moved upward. Accordingly, the headrest 15 held at the slider 30 by means of the stays 16 is moved upward. That is, the headrest operating mechanism 20 moves the headrest 15 in an upward direction in conjunction with the backward sliding movement of the seat body.

On the other hand, when the seat body slides forward (i.e., in the direction of arrow a1 in FIG. 5) and a distance is increased between the cable end 18*a* and the end 18*c* of the cable 18 for operating the headrest in a downward direction, the inner wire 18*b* wound around the pulley 23 is thereby pulled, and the pulley 23 rotates, clockwise in FIG. 1, along with the driving gear 24. In these circumstances, the rotational arm 27 connected to the driving gear 24 by means of the fan shaped gear 28 rotates counterclockwise along with the bush 29. In other words, the rotational arm 27 rotates in a direction so as to move the tip end thereof downward along with the bush 29, within a range restricted by the downward direction stopper 22*f*.

Because the sliding portion 29*a* of the bush 29 slides into the long bore 30*a* on the slider 30 while pushing against the inner wall surface of the long bore 30*c*, the slider 30 is guided by the guide portions 22*c*, 30*b* and moved downward. Accordingly, the headrest 15 held at the slider 30 by means of the stays 16 moved downward. In other words, the headrest operating mechanism 20 moves the headrest 15 in a downward direction in conjunction with the forward sliding movement of the seat body.

When either of a distance between the cable end 17*a* and the end 17*c* or a distance between the cable end 18*a* and the end 18*c* increases, the other of the distance between the cable end 17*a* and the end 17*c* and the distance between the cable end 18*a* and the end 18*c* decreases. Thus, in accordance with the unwinding operation of either the inner wire 17*b* or the inner wire 18*b*, the pulley 23 winds the other of the inner wire 17*b* and the inner wire 18*b* and this inner wire is returned into the cable at the upper rails 12*a*, 12*b*. The inner wires 17*b*, 18*b* are wound around the pulley 23 in a tense state. Thus, in a state where the gear portion 24*c* of the driving gear 24 and the gear portion 28*a* of the fan shaped gear 28 are geared with each other, a position of the headrest 15 is maintained unless a sliding operation is applied. In other words, even if a force in an upward or downward direction is applied to the headrest 15, the pulley 23 per se cannot be rotated unless either the inner wire 17*b* or the inner wire 18*b* is unwound and the other of the inner wire 17*b* and the inner wire 18*b* is wound. Accordingly, in a state where the sliding position is fixed, the inner wires 17*b* 18*b* are held in a pulled direction, the rotational position of the puller 23 per se is fixed, and the headrest 15 does not move.

Manual operation of the headrest 15 by means of the operational knob 35 will be explained with reference to FIG. 3 as follows. When the operational knob 35 is pushed, the connection portion 26*b* is pushed downward via the rod 34, and the lock release lever 26 rotates clockwise against the tension spring 33. In this case, the driving gear 24 is guided into the cam bore 26*a* and moves further away from the rotational center (i.e., hinge pin 31), and the gear portion 24*c* is disengaged from the gear portion 28*a* of the fan shaped gear 28. Thus, the rotational arm 27 fixed at the fan shaped gear 28 becomes rotatable without interfering with the driving gear 24 (i.e., the pulley 23).

Accordingly, the rotational arm 27 rotates while sliding the sliding portion 29*a* into the long bore 30*c* in accordance with the upward or downward movement of the slider 30, and the headrest 15 can be manually moved upward or downward. When the external force of the operational knob 35 is released, the lock release lever 26 is returned to the normal lever position by the biasing force of the tension spring 33, and the gear portion 24*c* of the driving gear 24 is geared with the gear portion 28*a* of the fan shaped gear 28 at the rotational position of the rotational arm 27 at that time. In this case, the headrest 15 is held at a position (i.e., height) of the slider 30 depending on the rotational position of the rotational arm 27.

Figure 6:
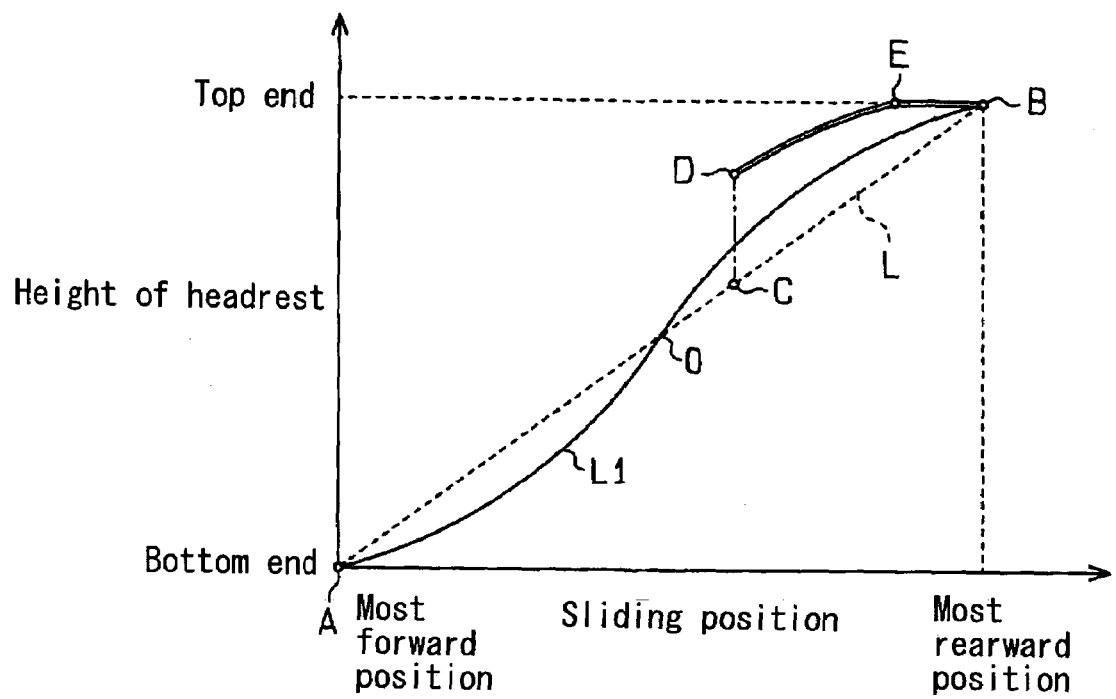
FIG. 6 is a graph illustrating a relationship between a sliding position and a height of a headrest.
Figure 7:
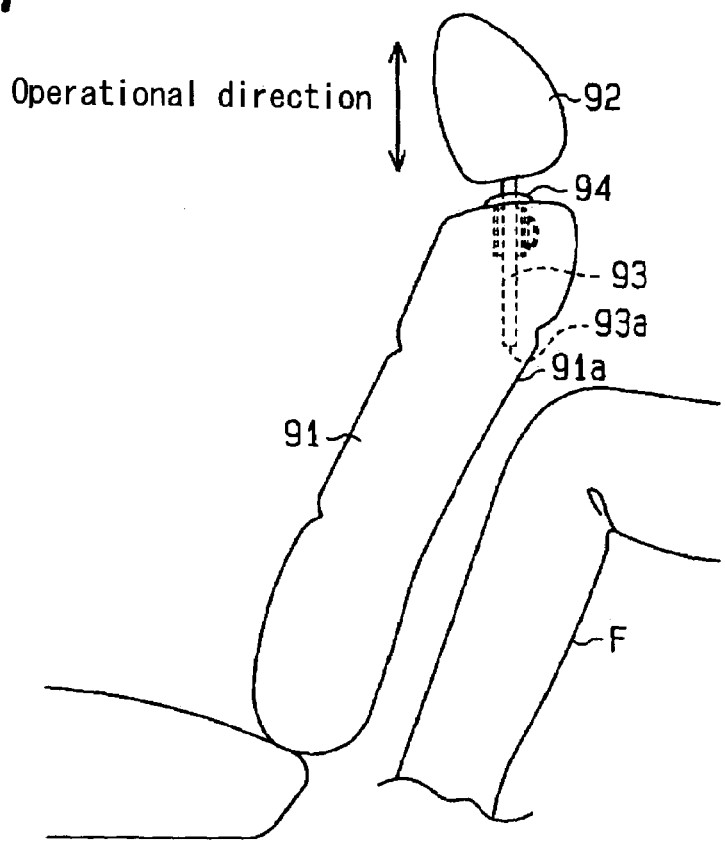
FIG. 7 is an explanatory view of a known device.

As shown in FIG. 6, a point A illustrates a sliding position at the most forward position and a height of the headrest 15 at a bottom end. A point B illustrates a state in which the sliding position is a most backward position and a height of the headrest 15 at a top end. The bottom end of the height of the headrest 15 is defined by the engagement of the bush 29 to the downward direction stopper 22*f* of the base member 22 and with further rotation of the rotational arm 27 restricted. Likewise, the top end of a height of the headrest 15 is defined by the engagement of the bush 29 to the upward direction stopper 22e, and with further rotation of the rotational arm 27 restricted.

A line L represented by a dotted line corresponds to a line connecting point A and point B, and a curve L1 represented by a solid line illustrates a relationship between the sliding position of the seat body and a height of the headrest 15 in conjunction with the operation of the headrest operating mechanism 20. As shown in FIG. 6, the curve L1 corresponds to a sine curve having a line L as a base line. The curve L1 crosses the line L at a central point O between point A and point B. The relationship between the sliding position of the seat body and a height of the headrest 15 is determined, for example, by determining the ratio of the diameters of the pulley 23 and the driving gear 24 and a gear ratio between the driving gear 24 (i.e., the gear portion 24c) and the fan shaped gear 28 (i.e., the gear portion 28a).

Let us assume, for example, that at a given sliding position C the headrest 15 is manually operated so as to be moved in an upward direction to a position corresponding to a point D located higher than the curve L1, and the seat body is operated to slide from this state in a backward direction. At this time, the headrest 15 starts to move upward from the position corresponding to point D in conjunction with the rearward sliding movement of the seat body. Thus, a height of the headrest 15 reaches a top end at a point E corresponding to a position before the sliding position reaches the most rearward position. Accordingly, even after a height of the headrest 15 has reached the top end, it is necessary to provide for the rotation of the pulley 23 and the driving gear 24 in conjunction with the sliding movement.

When the seat body slides forward in a state where the headrest 15 is positioned at a height corresponding to point D, by starting the lowering operation of the headrest 15 from a position corresponding to point D, the sliding position reaches the most forward position even when a height of the headrest 15 has not reached the bottom end.

The operation explained above applies also when the headrest 15 is manually lowered to a position lower than the curve L1. Accordingly, a construction involving the rotational allowance of the pulley 23 and the driving gear 24 in conjunction with the sliding movement in a state where a height of the headrest 15 reaches the top end will be explained with reference to FIG. 4.

As shown in FIG. 4, in addition to the fan shaped gear 28, a pair of pawls 36, 36(i.e., serving as a switching member) and a torsion spring 37 are provided on a back surface of the rotational arm 27. A stopper portion 27a is formed on both sides of intermediate portions in a longitudinal direction of the rotational arm 27. The pair of pawls 36 is arranged so as to be sandwiched between the stopper portions 27a, 27a positioned at both peripherally exothermal sides of the fan shaped gear 28 and the pawls 36 are rotatably supported by the rotational arm 27. Each of the pawls 36, 36 includes a tooth configured portion 36a which is configured in an essentially a gear form of the gear portion 28a, a restriction portion 36b opposing the stopper portion 27a, and an extending portion 36c which extends to a base end of the fan shaped gear 28. A rotation of the pawl 36 in a direction where the tooth configured portion 36a is separated from the gear portion 28a is restricted within a range extending from a state where the tooth configured portion 36a is in contact with the fan shaped gear 28 to a state where the restriction portion 36b is in contact with the stopper portion 27a.

Figure 4A:
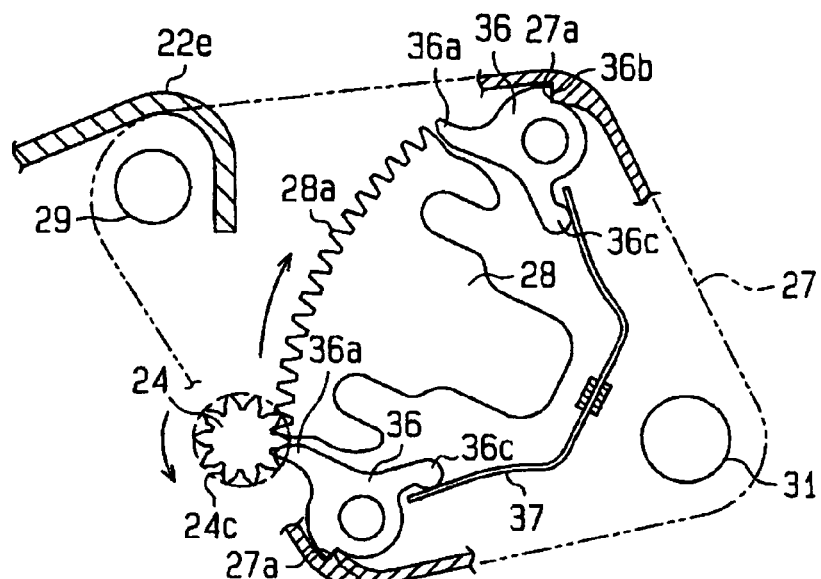
FIGS. 4a–4c are front views showing operation according to the embodiment of the present invention.

As shown in FIG. 4a, the pawl 36 is arranged so that the tooth configured portion 36a can be deemed to be a gear tooth that is a continuation of a gear tooth at the very end of the gear portion 28a when the pawl 36 is at a position where the restriction portion 36b is in contact with the stopper portion 27a. In other words, the tooth configured portion 36a, in this case, is arranged so as to have approximately the same pitch as the gear teeth of the gear portion 28a. Accordingly, the gear portion 24c geared with the gear tooth at the very end of the gear portion 28a is further geared with the tooth configured portion 36a which is arranged as a continuation of the gear portion 28a in accordance with the rotation of the fan shaped gear 28.

Figure 4B:
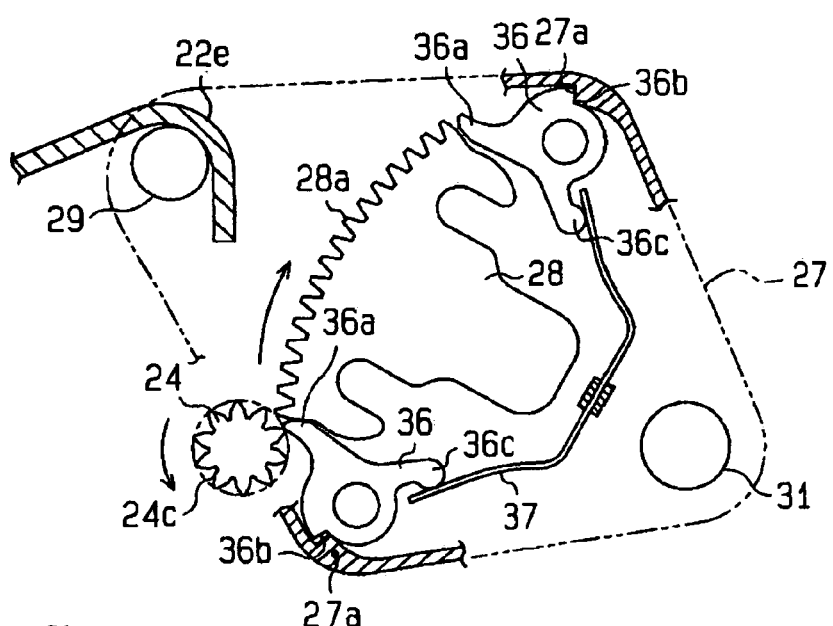

On the other hand, as shown in FIG. 4b, the pawl 36 is arranged so that the tooth configured portion 36a deviates from the rotational locus of the gear portion 24c when the pawl 36 is at a rotational position where the gear configured portion 36a is in contact with the fan shaped gear 28. It goes without saying that the gear portion 28a deviates from the rotational locus of the gear portion 24c. Accordingly, in the foregoing state, the driving gear 24 (i.e., the gear portion 24c) becomes freely rotatable relative to the fan shaped gear 28.

The torsion spring 37 is secured to the rotational arm 27 at a base end side of the fan shaped gear 28. A pair of free ends of the torsion spring 37 elastically contacts the extended portion 36c of the pawl 36. The torsion spring 37 biases the pawls 36, 36 via the extended portion 36c so that the restriction portion 36b contacts the stopper portion 27a. Thus, in normal operations the tooth configured portion 36a of the pawl 36 is arranged as a gear tooth that is a continuation of the gear tooth at the very end of the gear portion 28a (shown in FIG. 4a).

With the foregoing construction, as shown in FIG. 4a, when a height of the headrest 15 reaches a state where it is almost at the top end by means of the rotation of the driving gear 24, the gear portion 24c is geared with the gear configured portion 36a arranged as a continuation of the gear tooth at the very end of the gear portion 28a. When the driving gear 24 is further rotated from the foregoing state, the tooth configured portion 36a is pushed by the gear teeth of the gear portion 24c, and as shown in FIG. 4b, the pawl 36 rotates clockwise until the tooth configured portion 36a contacts the fan shaped gear 28 against the torsion spring 37. In these circumstances, the driving gear 24 idles because the tooth configured portion 36a deviates from the rotational locus of the gear portion 24c, and the driving gear 24 freely rotates relative to the fan shaped gear 28. In the foregoing construction, further rotation of the pulley 23 and the driving gear 24 in conjunction with the backward sliding movement of the seat body is allowed, even after a height of the headrest 15 has reached the top end.

Figure 4C:
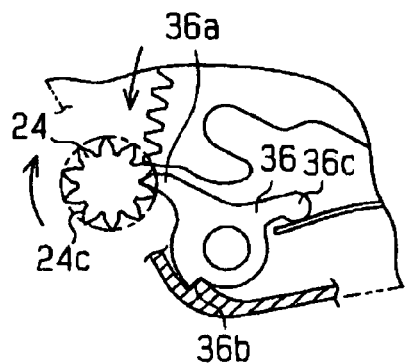

As shown in FIG. 4c, when the pulley 23 and the driving gear 24 rotate in a reverse direction in conjunction with the forward sliding movement at in a state where the gear portion 24c is geared with the tooth configured portion 36a, the tooth configured portion 36a enters the bottom between teeth of the gear portion 24c, and this state is maintained because the restriction portion 36b is in contact with the stopper portion 27a. Thus, the tooth configured portion 36a functions as a gear tooth arranged as a continuation of a gear tooth at the very end of the gear portion 28a, and the headrest 15 immediately starts to decline from a position corresponding to the top end.

In a state where the headrest 15 reaches a point E shown in FIG. 6, a height of the headrest 15 is maintained at the top end even if the seat body slides further backward. The headrest 15 starts to decline at a time when the sliding movement in the forward direction is initiated irrespective of the sliding position, and thus restarts the operation regarding the sliding movement.

According to the embodiments of the present invention, the following effects can be attained.

According to the embodiment of the present invention, the pulley 23 rotates so as to either unwind or wind the inner wires 17b, 18b in conjunction with the sliding movement of the seat body in either a forward or backward direction. Thereafter, in accordance with the rotation of the pulley 23, the rotational arm 27 is rotated by means of the driving gear 24 and the fan shaped gear 28. The rotational movement of the rotational arm 27 is converted into linear movement by the slider 30, and the headrest 15 moves upward or downward depending on the rotational direction of the rotational arm 27 (i.e., the rotational direction of the pulley 23. Thus, by means of the pulley 23 which switches the rotational direction in accordance with the sliding movement of the seat body in a forward or backward direction, the headrest 15 can be selectively moved upward or downward in accordance with the rotational direction of the pulley 23. In other words, the headrest 15 can be operated in both upward and downward directions stably in conjunction with the sliding movement of the seat body. Because, with the construction of the embodiment of the present invention, it is not necessary to provide an individual construction for operating the headrest in an upward direction or downward, a device can be reduced in size.

According to the embodiment of the present invention, the rotational arm 27 can be rotated by the pulley 23 with a simple construction which includes the driving gear 24 serving as the rotational shaft of the pulley 23, and the fan shaped gear 28 connected by virtue of being geared with the driving gear 24.

According to the embodiment of the present invention, the lock release lever 26 guides the driving gear 24 (i.e., the first shaft portion 24b) via the cam bore 26a, and maintains a state where the driving gear 24 is geared with the fan shaped gear 28. Accordingly, the rotational arm 27 is rotated by the pulley 23 via the driving gear 24 and the fan shaped gear 28.

On the other hand, the lock release lever 26 guides the driving gear 24 into the cam bore 26a by means of external force from the operational knob 35, and moves the driving gear 24 into a state where the engagement between the fan shaped gear 28 and the driving gear 24 is released. Thus, in these circumstances, the rotation of the rotational arm 27 is lowered without interfering with the pulley 23, or the like. Accordingly, the linear movement where the headrest 15 is operated manually in upward and downward directions is allowed as the rotational movement of the rotational arm 27 via the slider 30. That is, by adding external force from the operational knob 35 to the lock release lever 26, the headrest 15 can be manually operated in an upward or downward direction irrespective of the sliding movement of the seat body.

According to the embodiment of the present invention, by means of the biasing force of the tension spring 33, a geared state between the driving gear 24 and the fan shaped gear 28 provided by means of the lock release lever 26 can be stably maintained.

According to the embodiment of the present invention, when the driving gear 24 further rotates beyond the gear tooth at the very end of the gear portion 28a of the fan shaped gear 28, the driving gear 24 is idly operated by means of the pawl 36. Accordingly, even if the pulley 23 (i.e., the driving gear 24) is continuously rotated in accordance with the sliding movement of the seat body after the rotational arm 27 has reached a critical position at which the rotation of the rotational arm 27 is allowed, that is, a critical position (i.e., the top end or bottom end) at which the operation of the headrest in the upward or downward direction is allowed, the height of the headrest 15 can be maintained in the critical position because the driving gear 24 is idling.

On the other hand, when the driving gear 24 rotates in a reverse direction from a tooth gear at the very end of the gear portion 28a of the fan shaped gear 28, the driving gear 24 is geared with the fan shaped gear 28 by means of the pawl 36. Thus, when the headrest 15 reaches a critical position at which the rotation of the rotational arm 27 is allowed, that is, a critical position at which the operation of the headrest 15 in an upward or downward direction is allowed, in accordance with the sliding movement the headrest 15 can be immediately made to start to decline from the critical position in a reverse direction by means of the rotation of the pulley 23 (i.e., the driving gear 24).

Generally, the sliding position of the seat body is not adjusted to be positioned at the most forward position and its vicinity or at the most backward position and its vicinity. This arrangement is made because at the aforementioned positions, it is difficult for an occupant to drive because the occupant is positioned either too close to, or too far from, a steering wheel. Thus, it is preferable that a height of a bottom end of the headrest which is idealistic for an individual with small physical characteristics and a height of a top end of the head rest which is idealistic for an individual with larger physical characteristics be determined at positions before the most forward position and before the most backward position. According to the embodiment of the present invention, a relationship between the sliding position and a height of the headrest 15 is depicted with a sine curve (curve L1) as shown in FIG. 6. Thus, compared to cases where the headrest is moved, for example, following the line L, a height of the headrest 15 can be made to extend to the bottom end at a position before the sliding position reaches the most forward position, and a height of the headrest 15 can be made to extend to the top end at a position before the sliding position reaches the most backward position. Because the relationship of the sine curve is achieved by converting the rotational movement of the rotational arm 27 (i.e., the fan shaped gear 28) to a linear movement of the slider 30, for example, it is not necessary to provide an individual driving motor or other devices (i.e. electronic control devices) for controlling the driving motor.

The embodiment of the present invention may be changed as follows.

The base member 22 may be fixed to a position other than the seatback frame 14 of the seatback 10a as long as the base member 22 can be fixed firmly.

The rotational arm 27 and the fan shaped gear 28 may be unitarily formed.

Constructions other than the double pipe type may be applied for the cable 17 for operating the headrest in an upward direction and the cable 18 for operating the headrest in a downward direction as long as the tension for rotating the pulley is generated in conjunction with the sliding movement. In this case, other rope members such as wire rope and cotton rope may be adopted as long as sufficient strength can be ensured.

The inner wires 17b 18b may be connected as one unit as long as being fixed to the pulley 23.

Means for transmitting rotation between the pulley 23 and the rotational arm 27 is not limited to a geared connection of the driving gear 24 and the fan shaped gear 28. For example, the transmission of rotation between the pulley 23 and the rotational arm 27 may be conducted by bridging the pulley 23 and the rotational arm 27 by means of a belt and a rope, or the like.

A coil spring, a leaf spring, a bar shaped spring, or the like, may be applied to the tension spring 33.

According to the embodiment of the present invention, the pulley rotates by either unwinding or winding a first end or a second end of a rope member in conjunction with a sliding movement of the seat body in a forward or rearward direction. Thus, in accordance with the rotation of the pulley, the rotational arm is rotated by means of a rotation transmission member. The rotational movement of the rotational arm is converted into the linear movement by means of a conversion member, and the headrest is operated in an upward or downward direction in response to the rotational direction of the rotational arm (i.e., the rotational direction of the pulley). Thus, by means of the pulley which switches its rotational direction in response to the direction of the sliding movement, in either a forward direction or a rearward direction, the headrest can be selectively operated in an upward or downward direction in accordance with the rotational direction of the pulley. In other words, the operation of the headrest in conjunction with the sliding movement of the seat body can be stabilized for both in the upward and downward directions. Further, for example, because it is not necessary to include a mechanism for operating the headrest in an upward direction or a downward direction individually, a device per se can be reduced in size.

According to the embodiment of the present invention, the rotational arm can be rotated by the pulley with a simple construction including a driving gear serving as a rotational shaft of the pulley, and a driven gear which is connected by being geared with the driving gear.

According to the embodiment of the present invention, the lever basically guides the driving gear with the cam bore and maintains the geared state between the driving gear and the driven gear. Thus, the rotational arm is driven by means of the pulley via the driving gear and the driven gear.

On the other hand, the lever guides the driving gear with the cam bore by the external force to move the driving gear to be disengaged from the driven gear. Thus, in the foregoing state, the rotation of the rotational arm is allowed without interfering with the pulley, or the like. Accordingly, the linear movement when the headrest is manually operated is allowed as the rotational movement of the rotational arm by means of the conversion member. That is, by applying the external force to the lever, the headrest can be manually operated in upward and downward directions irrespective of the sliding movement of the seat body.

According to the embodiment of the present invention, by means of the biasing force of the biasing means, the lever can stably maintain a state where the driving gear and the driven gear are engaged.

According to the embodiment of the present invention, when the driving gear is further rotated beyond the gear tooth at the very end of the fan shaped gear, the driving gear is operated idly by means of the switching member. Accordingly, even if the pulley (i.e., the driving gear) is continuously rotated in accordance with the sliding movement after the position of the headrest has reached the critical position at which the operation of the headrest in the upward direction or the downward direction is allowed, a height of the headrest can be maintained at the critical position because the driving gear is idling.

On the other hand, when the driving gear is rotated in a reverse direction from the gear tooth positioned at the very end of the gear portion of the fan shaped gear, the engagement between the driving gear and the fan shaped gear is established by means of the switching member. Accordingly, when the position of the headrest reaches the critical position at which the operation of the headrest in the upward or downward direction is allowed, the headrest can be immediately start the operation in the upward or downward direction by means of the rotation of the pulley (i.e., the driving gear) in the reverse direction in accordance with the sliding movement.

The principles, preferred embodiment and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A headrest height adjustment device, comprising:
   a base member;
   a pulley rotatably supported by the base member, the pulley being rotatable in a first direction by unwinding a first end of a rope member wound around the pulley and by winding a second end of the rope member in conjunction with sliding movement of a seat body either in a forward or rearward direction, and the pulley being rotatable in a second direction by winding the first end of the rope member wound around the pulley and unwinding the second end of the rope member in conjunction with sliding movement of the seat body;
   a rotational arm rotatably supported by the base member and rotated by the pulley through a rotation transmission member; and
   a conversion member engaged with the rotational arm for operating a headrest in an upward or downward direction by converting rotational movement of the rotational arm into linear movement.

2. The headrest height adjustment device according to claim 1, wherein the rotation transmission member includes a driving gear serving as a rotational shaft of the pulley; and
   a driven gear fixed on the rotational arm and engaged by being geared with the driving gear.

3. The headrest height adjustment device according to claim 2, further comprising:
   a lever including a cam bore into which the driving gear is inserted, the lever for holding engagement between the driving gear and the driven gear by guiding the driving gear by the cam bore, and for moving the driving gear into a state where the engagement between the driving gear and the driven gear is disengaged by guiding the driving gear by the cam bore by means of external force; wherein
   the driving gear is supported by the base member at a long bore at which the driving gear is allowed to move between a state where the driving gear is engaged with the driven gear and a state where the driving gear is disengaged from the driven gear.

4. The headrest height adjustment device according to claim 3, further comprising:
a biasing means for generating biasing force for holding the engagement between the driving gear and the driven gear by guiding the driving gear by the cam bore relative to the lever.

5. The headrest height adjustment device according to claim 2, wherein the driven gear includes a fan shaped gear; and further comprises
a switching member for idly operating the driving gear when the driving gear further rotates beyond a very end portion of a gear portion of the fan shaped gear, and for establishing engagement between the driving gear and the fan shaped gear when the driving gear rotates in a reverse direction.

6. The headrest height adjustment device according to claim 3, wherein the driven gear includes a fan shaped gear; and further comprises
a switching member for idly operating the driving gear when the driving gear further rotates beyond a very end portion of a gear portion of the fan shaped gear, and for establishing engagement between the driving gear and the fan shaped gear when the driving gear rotates in a reverse direction.

7. The headrest height adjustment device according to claim 4, wherein the driven gear includes a fan shaped gear; and further comprises
a switching member for idly operating the driving gear when the driving gear further rotates beyond a very end portion of a gear portion of the fan shaped gear, and for establishing engagement between the driving gear and the fan shaped gear when the driving gear rotates in a reverse direction.

8. The headrest height adjustment device according to claim 1, wherein the rope member is a double piped cable for operating the headrest in an upward direction and a double piped cable for operating the headrest in a downward direction.

9. The headrest height adjustment device according to claim 8, wherein the double piped cable for operating the headrest in the upward direction and the double piped cable for operating the headrest in the downward direction respectively extend from a first side and a second side of a headrest operating mechanism.

10. The headrest height adjustment device according to claim 8, wherein the headrest adjustment device is mounted on a seatback of a seat body, with the seat body being supported on a first upper rail that is slidably supported on a first lower rail;
wherein a cable end of the cable for operating the headrest in the upward direction is fixed on an exterior surface of the first upper rail and an end of an inner wire protruding from a tip of the cable end is fixed on an exterior surface of the first lower rail.

11. The headrest height adjustment device according to claim 10, wherein the end of the inner wire is positioned closer to a front of the vehicle than to the cable end.

12. The headrest height adjustment device according to claim 11, wherein the cable for operating the headrest in the upward direction extends from the first upper rail to a second lower arm in a longitudinal direction of a connection rod, and further extends in the longitudinal direction of a second side frame.

13. The headrest height adjustment device according to claim 12, wherein the cable end of the cable for operating the headrest in the upward direction is connected to a headrest operating mechanism.

14. The headrest height adjustment device according to claim 8, wherein the seat body is also supported on a second upper rail that is slidably supported on a second lower rail;
wherein a cable end of the cable for operating the headrest in the downward direction is fixed on an exterior surface of the second upper rail and an end of an inner wire protruding from an end of the cable end is fixed on an exterior surface of the second lower rail.

15. The headrest height adjustment device according to claim 14, wherein the end of the inner wire is positioned so as to be further to the rear of the vehicle than the cable end.

16. The headrest height adjustment device according to claim 15, wherein the cable for operating the headrest in the downward direction extends from the second upper rail to a first lower arm, and further extends in a longitudinal direction of a first side frame.

17. The headrest height adjustment device according to claim 16, wherein the cable end of the cable for operating the headrest in the downward direction is connected to a headrest operating mechanism.

18. A vehicle seat comprising:
a seat body comprising a seatback frame and a seat cushion frame; and
a headrest adjustment device mounted on the seat body, the headrest adjustment device comprising:
a base member fixed at the seatback frame;
a pulley rotatably supported by the base member, the pulley being rotatable in a first direction by unwinding a first end of a rope member wound around the pulley and winding a second end of the rope member around the pulley in conjunction with sliding movement of the seat body either in a forward or rearward direction, and the pulley being rotatable in a second direction by winding the first end of the rope member around the pulley and unwinding the second end of the rope member from the pulley in conjunction with sliding movement of the seat body;
a rotational arm rotatably supported by the base member and rotated by the pulley through a rotation transmission member; and
a conversion member engaged with the rotational arm for operating a headrest in an upward or downward direction by converting rotational movement of the rotational arm into linear movement.

19. The vehicle seat according to claim 18, wherein the seat body is supported on a first upper rail slidably supported on a first lower rail and a second upper rail slidably supported on a second lower rail, the rope member comprising a first cable for operating the headrest in an upward direction with an inner wire having an end protruding outwardly beyond an end of the first cable, and a second cable for operating the headrest in a downward direction with an inner wire protruding outwardly beyond an end of the second cable.

20. The vehicle seat according to claim 19, wherein the end of the first cable is fixed on an exterior surface of the first upper rail and the end of the inner wire protruding outwardly beyond the end of the first cable is fixed on an exterior surface of the first lower rail, and wherein the end of the second cable is fixed on an exterior surface of the second upper rail and the end of the inner wire protruding outwardly beyond the end of the second cable is fixed on an exterior surface of the second lower rail.

* * * * *